UNITED STATES PATENT OFFICE.

THEODOR DIEHL AND MAX MOELLER, OF BERLIN, GERMANY, ASSIGNORS TO THE ACTIEN-GESELLSCHAFT FÜR ANILIN FABRIKATION, OF SAME PLACE.

BLUE-BLACK AZO DYE.

SPECIFICATION forming part of Letters Patent No. 511,688, dated December 26, 1893.

Application filed July 19, 1893. Serial No. 480,922. (Specimens.) Patented in England April 6, 1892, No. 6,630, and in France May 4, 1892, No. 221,373.

*To all whom it may concern:*

Be it known that we, THEODOR DIEHL and MAX MOELLER, of Berlin, in the Kingdom of Prussia, German Empire, have invented new and useful Improvements in the Production of a Blackish-Blue Dye, (for which we have received Letters Patent in England, No. 6,630, dated April 6, 1892, and in France, No. 221,-373, dated May 4, 1892;) and we do hereby declare that the following is a full, clear, and exact description of the invention, which will enable others skilled in the art to which it appertains to make and use the same.

This invention relates to the production of a blackish-blue azo dye derived from para-amidobenzene-azoamido-alphanaphtalene. As described by Theodor Diehl in a separate specification, Serial No. 476,280, filed June 1, 1893, this case may be converted into a diazo compound, which yields when combined in alkaline solution with one molecule of gamma-amido-naphtolmonosulfo acid a blue-black dye of great technical value. We have now discovered, that a new valuable dyestuff may also be obtained, by reacting with the aforesaid diazo compound upon one molecule of the 1:8 amidonaphtolmonosulfo acid, which may be prepared by melting with alkalies the alphanaphtylaminedisulfo acid, mentioned in the German Letters Patent No. 40,571.

In carrying out our process practically we proceed as follows: Twenty-six kilograms para-amidobenzeneazoamido-alphanaphtalene are dissolved in diluted hydrochloric acid and diazotized by the action of a solution of seven kilograms nitrite of soda. The solution of the diazo compound is poured into an alkaline solution of twenty-five kilograms 1:8 amidonaphtolmonosulfo acid, the mixture being kept alkaline during the reaction. A dark-blue precipitate separates at first; the mixture is well stirred for some time and afterward gently heated; the coloring matter, which on heating partly has been dissolved is precipitated completely by the addition of common salt. After salting out, the dyestuff is filtered off, pressed and dried.

Our new dyestuff possesses the following properties: When thoroughly pulverized it forms a dark-brown powder, difficultly soluble in cold water, but easily soluble in hot water with blackish-violet color, which turns bluish on the addition of caustic soda lye. On adding mineral acids or concentrated acetic acid to the aqueous solution of the dyestuff the free color-acid separates in the form of a dark-violet precipitate. The coloring matter dissolves pretty well in alcohol with pure blue color. It is soluble in concentrated sulfuric acid with a greenish-indigo-blue color, which solution changes on addition of water at first into violet-red and on further dilution separates a fine violet precipitate. The dyestuff dyes unmordanted cotton in an alkaline or neutral bath containing some common salt or Glauber salt blackish-blue. It may also be fixed on wool in a dye bath containing some salt and produces a dark-blue shade. Hereby and by its aforesaid other characteristic properties our new dye differs from the product prepared with the isomeric gamma-amidonaphtolmonosulfo acid, as described in the hereinbefore mentioned specification of Theodor Diehl.

What we claim as our invention, and desire to secure by Letters Patent, is—

The blackish-blue dye derived from one molecule of the diazo compound of para-amidobenzene-azoamido-alphanaphtalene and one molecule of the herein described 1:8 amidonaphtol monosulfo acid—said dye being soluble in hot water with blackish violet, in alcohol with pure blue color, dissolving in concentrated sulfuric acid with a greenish-indigo blue color, which solution on addition of water changes at first into violet-red and on further dilution separates a fine violet precipitate.

In testimony whereof we have signed our names, in the presence of two subscribing witnesses, this 23d day of June, A. D. 1893.

THEODOR DIEHL.
MAX MOELLER.

Witnesses:
WILHELM HERZBERG,
GUSTAV LUCHT.